Patented July 25, 1933

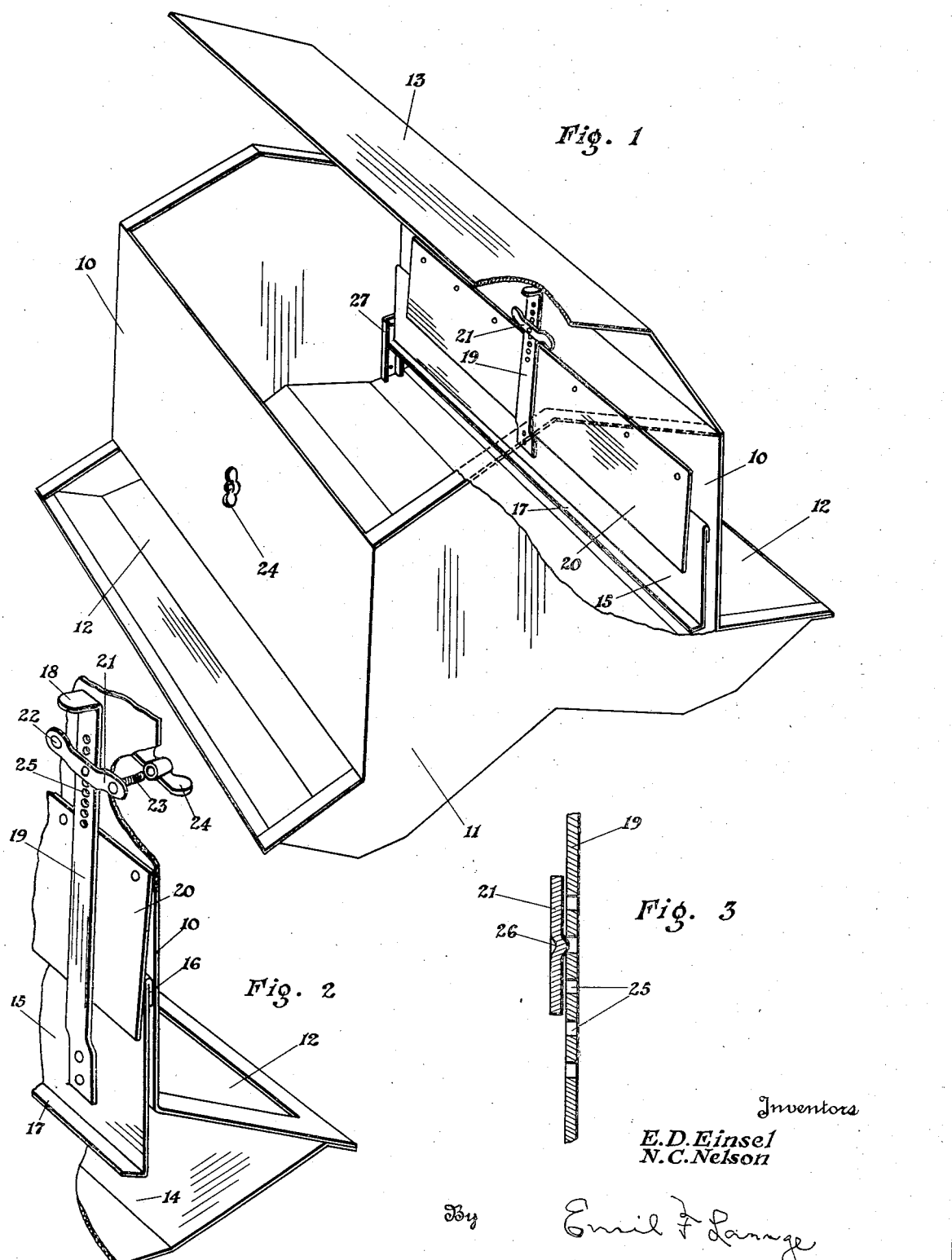

1,919,587

UNITED STATES PATENT OFFICE

ELMER D. EINSEL AND NELS C. NELSON, OF HASTINGS, NEBRASKA, ASSIGNORS TO THE HASTINGS EQUITY GRAIN BIN MANUFACTURING COMPANY, A CORPORATION OF NEBRASKA

VALVE FOR ANIMAL FEEDERS

Application filed August 4, 1931. Serial No. 555,090.

Our invention relates to animal feeders and more particularly to hog feeders of the kind adapted to hold under cover a quantity of hog feed which the hogs may consume from the feeder.

The primary object of the invention is the provision of a novel form of valve for controlling the rate of flow of the feed so that the feed can not be wasted.

Another object of the invention is the provision of easily adjustable means for increasing or decreasing the size of the vertical opening through which the feed must pass in order to be accessible to the animals.

Another object of the invention is the provision of a yieldable latch of simple construction for holding the valve in any of its adjusted positions so that the hogs can not lift the valve by thrusting their snouts upwardly against the lower edge of the valve.

Another object of the invention is the provision of guideways for controlling the movements of the valve so that the valve can not swing in a transverse direction.

Another object of the invention is the provision of a shield which will prevent the passage of finely ground feed in front of the valve.

Another object of the invention is the provision of a valve in such relation to a shield that the resistance to the opening movement of the valve is increased as the valve is being opened.

Having in view these objects and others which will be pointed out in the following description, we will now refer to the drawing, in which Figure 1 is a view in perspective of the hog feeder, the feed doors being omitted and parts being broken away to disclose interior structure.

Figure 2 is a fragmentary view in perspective of a portion of the valve in its relation to other parts of the feeder, a part being broken away to disclose the wing nut which controls the latch.

Figure 3 is a sectional view of the two latching members in their latching relation.

The hog feeder has side walls 10 and end walls 11 arranged in rectangular form. The middle portion of the bottom is in the form of an inverted U, there being two elongated flat portions directly under the lower edges of the side walls 10 and spaced therefrom. The outer portions of the bottom project upwardly and outwardly as shown in Figure 1. The space between the lower edges of the side walls 10 and the outer edges of the bottom is thus open so that the hogs can reach the food within the container. The opening at each side of the feeder slopes downwardly and outwardly and it is strongly reinforced at its edges to withstand the rough usage to which it is put by the animals. The opening 12 is provided with a plurality of hinged covers for protecting the contents of the feeder from the action of wind and rain, the covers being hinged so that the hogs may lift them with their snouts as in rooting. Since these covers constitute no part of the present invention and since they are well known in their generic form, illustration is believed to be unnecessary. The receptacle is further provided with a hinged roof 13 of inverted V form and hinged at one of its edges to one of the side walls 10 at its upper edge. The roof may readily be opened and closed when it is desired to gain access to the interior of the receptacle either for refilling the receptacle or for readjusting the valves. When the cover 13 is in its closed position it effectually prevents the entrance of wind and rain to the receptacle.

The food in the receptacle must pass through the throat formed by the lower edge of a side wall 10 and a flat portion of the floor. This throat is best seen at 14 in Figure 2. The feeder is designed, however, for feeding any suitable hog feed to the hogs. This might consist of a suitable bran mash or of any of various grains. The bran mash is a relatively slow flowing mass while the grains are more or less fluent, this being particularly true of those grains which have hard or polished coats. It is therefore obvious that a throat opening of the proper size for one food might be too large or too small for a different kind of food. This necessitates the use of a valve 15 which is adjustable for enlarging or reducing the size of the throat. This valve is bent over at its upper edge at 16 for strengthening purposes and its lower edge portion is bent inwardly at 17 at right angles to the body portion. While the lifting and the lowering of the valve is accomplished mainly by pushing and pulling on the handle portion 18 of the strap 19, the strip 17 will also be found convenient when pushing the valve 15 down or lifting it up.

In prior valve arrangements of a similar nature it has been found that finely ground feed would creep down between the side wall 10 and the valve 15. In time this feed accumulates between the two members and tends to prevent movement of the valve 15 beside resulting in the wastage of considerable quantities of feed. We have therefore provided a shield 20 which is rigidly secured to the side wall 10 as shown in Figures 1 and 2. The shield 20 is secured at only its upper edge but the securing means must be of such a nature that little or no finely ground feed may pass through between the upper edge of the shield 20 and the side wall 10. The shield may be secured to the side wall by means of rivets or by spot welding or seam welding. The shield 20 hangs down over the upper portion of the valve 15.

Since the parts are all made of sheet metal they are more or less resilient. As the valve 15 is moved upwardly it becomes more and more tightly wedged in the space between the shield 20 and the side wall 10 and the resistance to further upward movement increases rapidly as the upper limit of movement of the valve 15 is reached. This is particularly important because of the propensity of hogs to root in the feed and to attempt to force the valve 15 upwardly.

The strap 19 is secured at its lower extremity to the valve 15. It passes from thence upwardly and over the shield 20, being provided with a finger grip 18 at its upper extremity. It is further guided in its movement by means of a transverse strap 21 which is secured at its extremities to the side wall 10. The fastening device 22 at one extremity of the strap 21 may be a permanent fastening device such as a rivet or it may be in the form of a bolt. At the opposite extremity, however, is a fastening device 23 which is purposely made releasable by means of a wing nut 24 or other suitable releasable fastening device. The strap 19 is provided with a vertical series of apertures 25 which cooperate with a protuberance 26 on the strap 21, the protuberance 26 being formed as shown in Figure 3. The seating of the protuberance 26 in one of the apertures 25 constitutes a latch against the up or down movement of the valve 15 and it prevents the hogs from further opening the valve 15. In order to adjust the size of the opening it is necessary to first release the thumb nut 24 and then to raise or lower the valve 15 by grasping the handle portion 18 of the strap 19. When the valve 15 has been adjusted as desired the wing nut 24 must be tightened on the bolt 23 in order to firmly seat the protuberance 26 in an aperture 25.

The movement of the valve 15 is strictly in an up and down direction. Hogs are, however, rough animals especially when they are feeding and they tend to press against the outer surfaces of the valves 15 with their snouts and to thus damage the valves by bending the material. In order to obviate this we have provided guideways 27 secured to the end walls 11 of the feeder and of such a width that the valves 15 can slide up and down freely within the guideways.

In use the receptacle is filled with the feed. When this is bran mash very little of the feed, and in fact practically none of it, will be in the troughs 12. In this case the hogs reach in under the valve 15 to loosen the bran mash which becomes lodged there. If the feed is grain, either unground or coarsely ground, it will naturally flow from the receptacle through the throat underneath the valve 15 and into the troughs 12. The animals can then reach the feed which becomes automatically replaced from the receptacle as it is being consumed from the troughs, this being due to the natural flow of such feeds.

The present feeder has been designed initially and primarily as a hog feeder. Certain features and especially the valve, would be equally useful in any other kind of an animal feeder having an adjustable throat and we therefore wish to reserve to ourselves all rights to any and all uses to which our claimed structure may be put.

Having thus described our invention in such full, clear, and exact terms that its construction and operation will be readily understood by others skilled in the art to which it pertains, what we claim as new and desire to secure by Letters Patent of the United States is:

1. An animal feeder including an open top receptacle and a feed trough with a throat therebetween for passage of the feed from said receptacle to said trough, a valve for expanding or constricting said throat, a shield of resilient material secured at its upper edge to a wall of said receptacle, the upper portion of said valve being slidably positioned between said resilient shield and the wall of said receptacle, and a strap secured to said valve below the lower edge of said shield and projecting upwardly for manual operation through the open top of said receptacle to raise or lower said valve.

2. An animal feeder including an open top receptacle and a feed trough and having a throat therebetween, a resilient shield secured at its upper edge to a wall of said receptacle and above said throat, a valve slidable vertically between said shield and the wall of said receptacle for expanding or constricting said throat, said valve being free at its lower edge and being releasably clamped with its upper portion in frictional engagement with said resilient shield, a rigid strap secured to said valve adjacent the lower edge thereof and projecting upwardly for manual operation through the open top of said receptacle to raise or lower said valve, and clamping means secured to the wall of said receptacle for releasably engaging said strap to hold said valve in adjusted position.

3. An animal feeder including an open top receptacle and a feed trough with a throat therebetween for the passage of the feed from said receptacle to said trough, a valve for expanding or constricting said throat, a shield of resilient material secured at its upper edge to a wall of said receptacle, the upper edge of said valve being in double thickness and being positioned between said resilient shield and the wall of said receptacle, and a strap secured to said valve below the lower edge of said shield and projecting upwardly for manual operation through the open top of said receptacle to raise or lower said valve.

ELMER D. EINSEL.
NELS C. NELSON.